(12) United States Patent
Stauber et al.

(10) Patent No.: US 6,440,032 B1
(45) Date of Patent: Aug. 27, 2002

(54) TRANSMISSION SYSTEM

(75) Inventors: Roland Stauber; Friedrich J. Ehrlinger, both of Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/743,387

(22) PCT Filed: Jul. 8, 1999

(86) PCT No.: PCT/EP99/04794
§ 371 (c)(1),
(2), (4) Date: Jan. 9, 2001

(87) PCT Pub. No.: WO00/04302
PCT Pub. Date: Jan. 27, 2000

(30) Foreign Application Priority Data

Jul. 13, 1998 (DE) .......................................... 198 31 293

(51) Int. Cl.⁷ ............................................. F16H 37/02
(52) U.S. Cl. ...................................................... 475/207
(58) Field of Search ........................................ 475/207

(56) References Cited

U.S. PATENT DOCUMENTS

| | | | |
|---|---|---|---|
| 4,019,406 A | * 4/1977 | Herr | |
| 4,782,714 A | * 11/1988 | Schletzbaum et al. | ......... 74/360 |
| 5,009,118 A | 4/1991 | Raszkowski et al. | ......... 74/331 |
| 5,351,569 A | 10/1994 | Trick et al. | .................... 74/329 |
| 5,385,066 A | 1/1995 | Braun | .......................... 74/331 |
| 5,507,195 A | 4/1996 | Trick | ............................ 74/325 |
| 5,673,592 A | 10/1997 | Huggins et al. | ............... 74/336 |
| 6,029,532 A | * 2/2000 | Phillips | ..................... 74/421 R |
| 6,205,877 B1 | * 3/2001 | Vilain | .......................... 74/413 |
| 6,227,073 B1 | * 5/2001 | Vilain | ..................... 74/606 R |
| 6,234,037 B1 | * 5/2001 | Zimmer | ..................... 74/421 A |

FOREIGN PATENT DOCUMENTS

| | | |
|---|---|---|
| DE | 38 40 403 A1 | 7/1989 |
| DE | 41 29 290 C1 | 2/1993 |
| DE | 43 16 153 C1 | 7/1994 |
| DE | 44 36 083 A1 | 10/1995 |
| EP | 0 769 641 A1 | 4/1997 |
| WO | 92/21892 | 12/1992 |

OTHER PUBLICATIONS

Looman, Johannes, *Zahnradgetrieb*, Springer Publishing House, Berlin Heidelberg, 1996, 3d edition p. 264ff (to follow).

* cited by examiner

*Primary Examiner*—Dirk Wright
(74) *Attorney, Agent, or Firm*—Davis & Bujold, P.L.L.C.

(57) ABSTRACT

The invention relates to a system of structural shapes to build a line of products having gears of different total ratio or a different number of ratio steps. Transmissions (2) of vehicles consisting of three successively disposed partial gears (10, 22 40), a main gear part (22), a multi-gear split gear part (40) and a multi-gear group transmission (10) have for the split gear part (40) and the group transmission part (10) and the gear steps of each main gear part (22) in all structural shapes on all gear wheels (28, 32, 36) the same number of teeth with at least those gear wheel pairs (28-52-54, 32-50, 36-48) corresponding to the gear wheel pairs of the structural shape of the transmission (2) having the least number of gear steps.

11 Claims, 13 Drawing Sheets

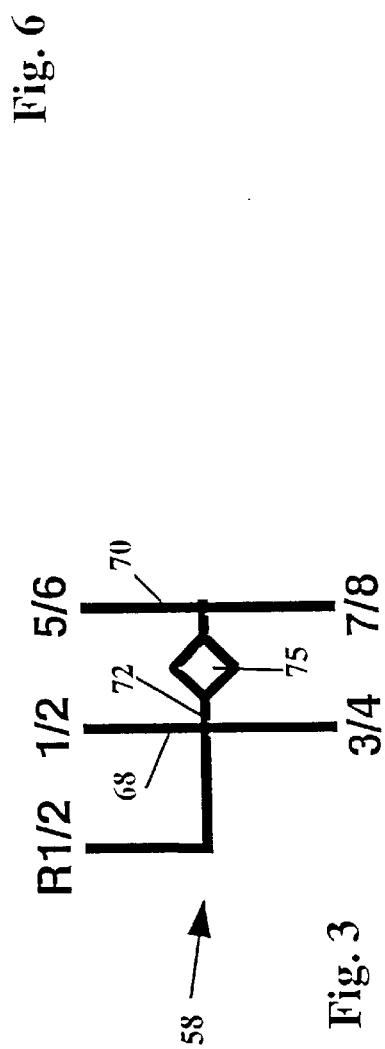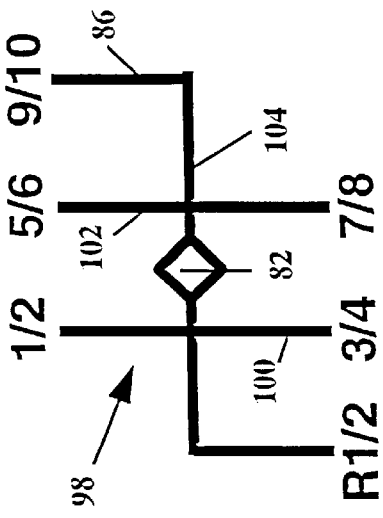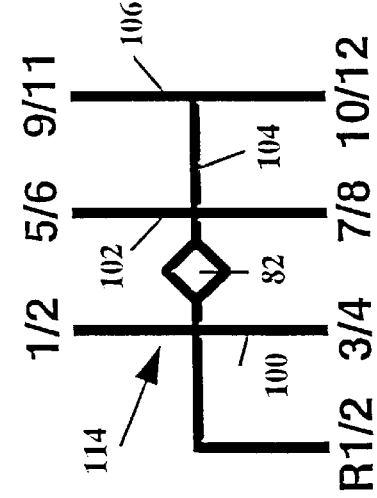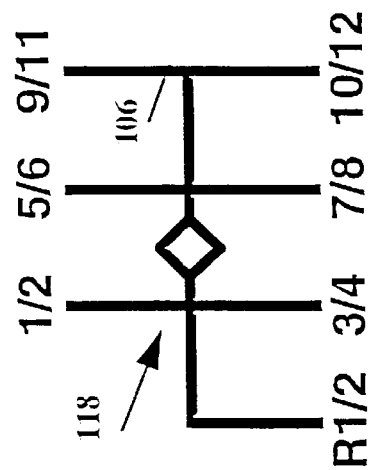

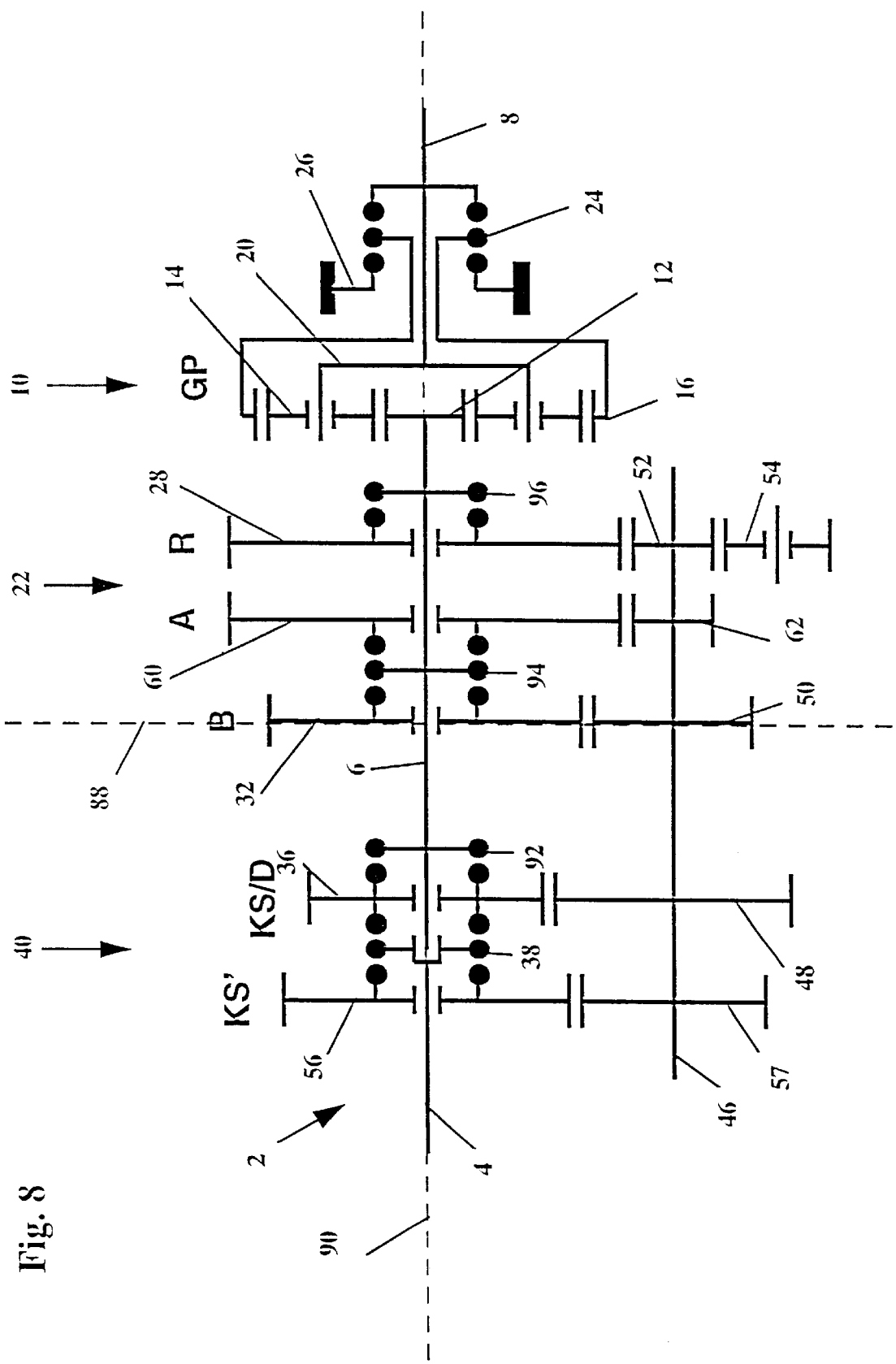

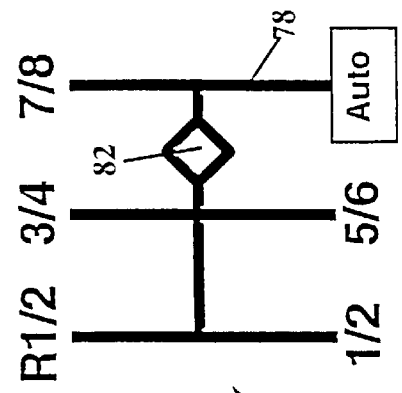
Fig. 20
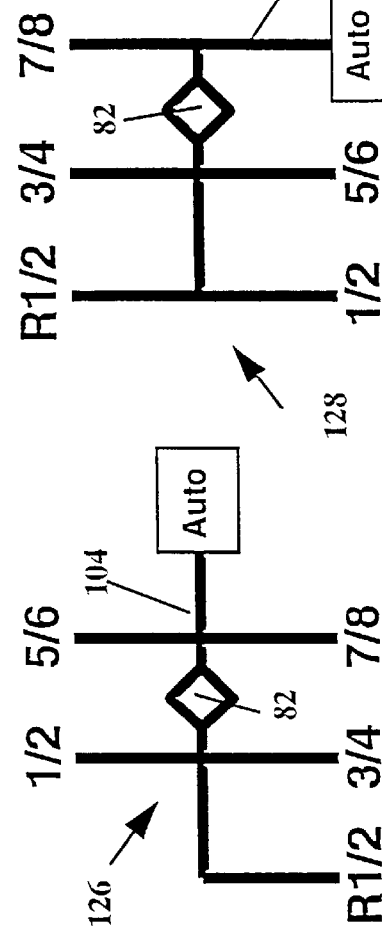
Fig. 19
Fig. 18
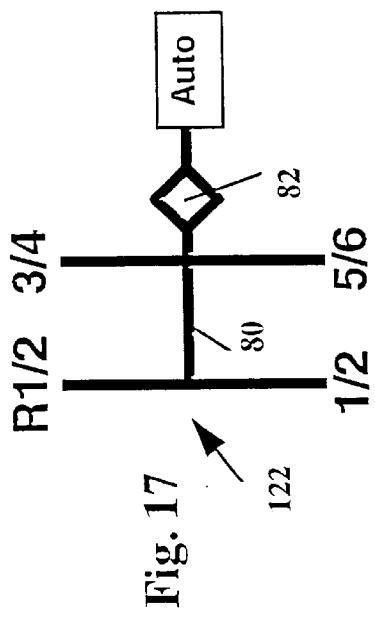
Fig. 17
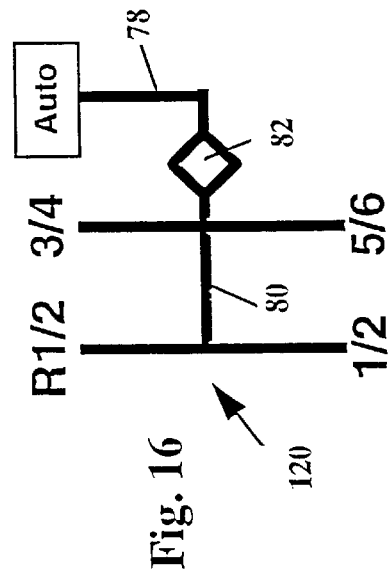
Fig. 16
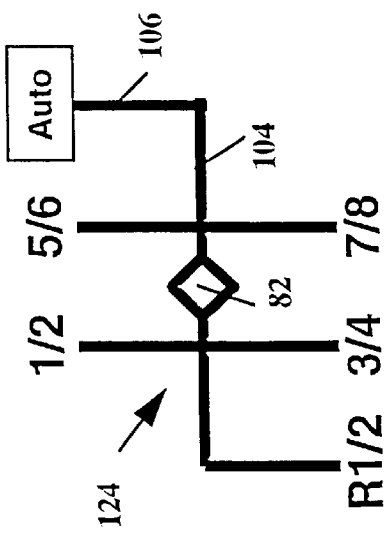

$$i_1 = i_{KL} * i_A * i_{GP} = \varphi^9 = 15,54$$
$$i_2 = i_{KS} * i_A * i_{GP} = \varphi^8 = 11,46$$
$$i_3 = i_{KL} * i_B * i_{GP} = \varphi^7 = 8,45$$
$$i_4 = i_{KS} * i_B * i_{GP} = \varphi^6 = 6,23$$
$$i_5 = i_{KL} * i_A = \varphi^5 = 4,59$$
$$i_6 = i_{KS} * i_A = \varphi^4 = 3,38$$
$$i_7 = i_{KL} * i_B = \varphi^3 = 2,50$$
$$i_8 = i_{KS} * i_B = \varphi^2 = 1,84$$
$$i_9 = i_{KL} * i_C = \varphi^{1,5} = 1,58$$
$$i_{10} = i_{KL} * i_D = \varphi^1 = 1,36$$
$$i_{11} = i_{KS} * i_C = \varphi^{0,5} = 1,16$$
$$i_{12} = \text{direkt} = \varphi^0 = 1,00$$

Fig. 21

$$i_1 = i_{KL} * i_A * i_{GP} = \varphi^9 = 15,54$$
$$i_2 = i_{KS} * i_A * i_{GP} = \varphi^8 = 11,46$$
$$i_3 = i_{KL} * i_B * i_{GP} = \varphi^7 = 8,45$$
$$i_4 = i_{KS} * i_B * i_{GP} = \varphi^6 = 6,23$$
$$i_5 = i_{KL} * i_A = \varphi^5 = 4,59$$
$$i_6 = i_{KS} * i_A = \varphi^4 = 3,38$$
$$i_7 = i_{KL} * i_B = \varphi^3 = 2,50$$
$$i_8 = i_{KS} * i_B = \varphi^2 = 1,84$$
$$i_9 = i_{KL} * i_D = \varphi^1 = 1,36$$
$$i_{10} = \text{direkt} = \varphi^0 = 1,00$$

Fig. 22

$$i_1 = i_{KL} * i_A * i_{GP} = \varphi^9 = 15,54$$
$$i_2 = i_{KS} * i_A * i_{GP} = \varphi^8 = 11,46$$
$$i_3 = i_{KL} * i_B * i_{GP} = \varphi^7 = 8,45$$
$$i_4 = i_{KS} * i_B * i_{GP} = \varphi^6 = 6,23$$
$$i_5 = i_{KL} * i_D * i_{GP} = \varphi^5 = 4,59$$
$$i_6 = \text{direkt} * i_{GP} = \varphi^4 = 3,38$$
$$i_7 = i_{KL} * i_B = \varphi^3 = 2,50$$
$$i_8 = i_{KS} * i_B = \varphi^2 = 1,84$$
$$i_9 = i_{KL} * i_D = \varphi^1 = 1,36$$
$$i_{10} = \text{direkt} = \varphi^0 = 1,00$$

Fig. 23

$$i_1 = i_{KL} * i_B * i_{GP} = \varphi^7 = 8,45$$
$$i_2 = i_{KS} * i_B * i_{GP} = \varphi^6 = 6,23$$
$$i_3 = i_{KL} * i_D * i_{GP} = \varphi^5 = 4,59$$
$$i_4 = \text{direkt} * i_{GP} = \varphi^4 = 3,38$$
$$i_5 = i_{KL} * i_B = \varphi^3 = 2,50$$
$$i_6 = i_{KS} * i_B = \varphi^2 = 1,84$$
$$i_7 = i_{KL} * i_D = \varphi^1 = 1,36$$
$$i_8 = \text{direkt} = \varphi^0 = 1,00$$

Fig. 24

TRANSMISSION SYSTEM

FIELD OF THE INVENTION

The invention relates to a system of structural shapes for transmissions of vehicles.

BACKGROUND OF THE INVENTION

The heavy costs compel manufacturers of transmissions to implement the necessary variants of a range of products with a minimum of different structural parts. Not only the variable cost of products is decisive, but also the complexity of costs resulting from the multiplicity of parts.

Changes in the internal combustion engines due to the introduction of the electronic injection techniques and the need of optimal solutions regarding costs for the different operation requirements of the vehicles always leads to different products. For example, in the class of medium and heavy trucks the gear range desired works with the following requirements:

12 gears, finely stepped in the upper gears;

optionally direct speed or high speed;

the same or similar conditions of the different gears;

10 gears with less fine grading;

broad torque ranges from about 1000 Nm to about 3000 Nm;

all products manually shifted, alternatively partly and/or fully automated.

A solution known already for use of similar parts in different transmissions is shown in the Applicant's ECOSPLIT-16-gear transmission disclosed, e.g. in the publication Johannes Looman's *Zahnradgetrieb*, third edition, Springer Publishing House, Berlin Heidelberg 1996 on pages 264 ff in different shapes. The same transmission with different wheel widths leads to transmission of torques of different magnitude. Different ratio series result in designs for direct-speed of high-speed versions. Adaptations can be made by changing the lengths of the wheels, shafts, housing gear selection, etc. Additional aggregates like can result in a change of the housing and of the driving teeth. The multiplicity of products used leads to undesirably high logistic costs and costs of adaptation to the respective individual situations. DE 41 29 290 A1 has disclosed a transmission line of products in a multi-gear transmission for reducing the multiplicity of parts for different admissible input torques. But here are provided only transmissions having the same number of ratio steps. The transmission lines of products do not concern any transmission with a different number of gears.

The transmissions often have versions with two different ratio series. This is offered by transmission manufacturers so that the vehicle manufacturers have available transmissions of equal structure which are adaptable to different utilizations of the vehicles. Thus, transmission in high-speed and direct-speed versions, e.g. can be built which are used in the cross-country or on the road.

The problem on which this invention is based is to overcome the existing problems and high costs and to show a system of structural parts for equivalent uses which are interchangeable for different transmissions having different numbers of gears.

SUMMARY OF THE INVENTION

It is proposed to provide a line of products of transmissions in a manner such that, departing from a basic variant which has a specific arrangement of gear wheel pairs, one other variant can be produced by changing or adding in the form of a modular system only one gear wheel pair. Thereby can be obtained a modified total ratio of the transmission either by maintaining the former number of ratio steps or by a higher number of ratio steps. In all cases, the gear wheels of the group transmission remain unchanged. All gear wheel pairs of the variant with the smallest number of reduction steps are kept in all variants.

The whole transmission consists of a multi-gear split gear part, a multi-gear main gear part and a multi-gear group transmission which are successively disposed in one line. The inventive system can be used both for transmissions having one countershaft and in transmissions having a load distribution over several, preferably two, countershafts. The group transmission preferably consists of a planetary transmission whose sun gear is driven by the main shaft of the transmission and whose planet carrier constitutes the output shaft of the transmission and whose planet carrier constitutes the output shaft of the transmission. The ring gear of the planetary transmission can optionally be coupled with the transmission housing or with the planet carrier to form different ratio steps. The basic variant is preferably formed by 8-gear variants. According to the inventive system, on the basis of the latter designs of 10-gear variants and 12-gear variants are advantageously formed.

As a basic condition, the ratio step i between all ratio steps is the same. The ratio step can also be provided as half ratio step $\phi^{0.5}$. The axial distances of the shafts in the transmissions are the same in all variants.

In an advantageous embodiment, the 12-gear variant has in comparison with the 10-gear variant an additional gear wheel pair shaped so that in the 12-gear transmission the ratio of the ninth gear is between the ratios of the gears 8 and 9 of the 10-gear transmission and the ratio of the eleventh gear is between the ratios of the gears 9 and 10 of the 10-gear transmission.

In another advantageous embodiment, it is proposed to build a high-speed variant of a transmission having the same number of ratios steps, to change one wheel pair of the main gear which does not constitute a constant wheel pair and to leave other wheel pairs of the transmission the same.

In one other advantageous embodiment, it is proposed to build a high-speed variant of a transmission having a number of ratio steps increased by two ratio steps, to add a wheel pair of the main gear and leave the same the other wheel pairs of the transmission.

Another advantageous embodiment comprises to build a high-speed variant of a transmission having a number of ratio steps increased by two ratio steps and formed from a direct-speed variant, the addition of a wheel pair to the main gear, the added wheel pair not constituting a wheel pair of a constant and the other wheel pairs of the transmission remaining the same.

In another advantageous embodiment, it is proposed to build a high-speed variant, to substitute for a wheel set of a constant a wheel set quicker by two ratio steps and to leave the same the other wheel pairs of the transmission.

One other advantageous embodiment proposes, in the manual gear shift of the transmission for changing the selector lever positions of a shift pattern, to dispose at least one gear wheel of the main gear upon the same shaft turned by 180 degrees around an imaginary axis. The imaginary axis is perpendicular to a longitudinal axis of the shaft.

In another advantageous embodiment, it is proposed that in a 12-gear transmission the ratio steps 1 to 8 and the reverse gear is manually shiftable and the ratio steps 9 to 12 automatedly shiftable and in the shift pattern of the transmission that a selector position is provided which marks the introduction of an automated gear shift mode.

A In another advantageous embodiment, it is proposed that in a 10-gear transmission the ratio steps 1 to 8 and the reverse gear is manually shiftable and the ratio steps 9 and 10 is automatedly shiftable and in the shift pattern of the transmission a selector lever position be provided which marks the introduction of an automated shift mode.

In still another advantageous embodiment, it is proposed that in a 10-gear transmission the ratio steps 1 to 6 and reverse gear is manually shiftable and the ratio steps 7 to 10 automatedly shiftable and in the shift pattern of the transmission a selector lever position is provided which marks the introduction of an automated gear shift mode.

For the above mentioned transmissions with automated shift mode, it is proposed as an advantageous design that the selector lever position for the automated shift mode be in an H- or HH-shift pattern in the outer right end of the selector gate.

Another advantageous shift pattern shows the selector lever position for the automated gear shift mode in an H- or HH-shift pattern at the end of an outer right shift gate.

Still another advantageous shift pattern shows the selector lever position for the automated gear shift mode in an H- or HH-shift pattern also in the outer right end of the selector gate, wherein to reach the selector lever position, there is provided in the selector gate a position in which is effected the gear shift of the range change group.

Still one other advantageous embodiment shows that the 12-gear variant, unlike the 10-gear variant, has an additional gear wheel pair which is shaped so that in the 12-gear transmission the ratio of the ninth gear is quicker by half a speed ratio change $\phi^{0.5}$ than the ratio of the eighth gear of the 10-gear variant and the ratio of the eleventh gear is quicker by half a speed ratio change than the ratio of the 10-gear variant.

Still another advantageous embodiment shows that the 12-gear variant, unlike the 10-gear variant, has an additional gear wheel pair shaped so that in the 12-gear transmission the ratio of the tenth gear is half of a speed ratio change $\phi^{0.5}$ quicker than the ratio of the ninth gear of the 10-gear variant and the ratio of the twelfth gear is quicker by half a speed ratio change than the ratio of the tenth gear of the 10-gear variant. Thereby the total spreading of the transmission is increased by one half $\phi^{0.5}$ a speed ratio change.

In another advantageous embodiment, it is proposed that in the partial gears a different number of identical countershafts is respectively provided, the wheel pairs in transmissions with different capacities having the same tooth widths and the housing and gear shifts being equal.

BRIEF DESCRIPTION OF THE DRAWINGS

The invention is explained in detail with reference to the drawings which show:

FIG. 3 is a shift pattern for an 8-gear transmission;

FIG. 6 is a shift pattern for a 10-gear transmission;

FIG. 8 is another transmission diagram for a high-speed transmission with 10 gears;

FIG. 9 is another shift pattern for a 10-gear transmission;

FIG. 12 is a shift pattern for a 12-gear transmission;

FIG. 15 is another shift pattern for a 12-gear transmission;

FIGS. 16 to 20 are shift patterns; and

FIGS. 21 to 24 are ratio series.

DESCRIPTION OF THE PREFERRED EMBODIMENTS

Figure 1:
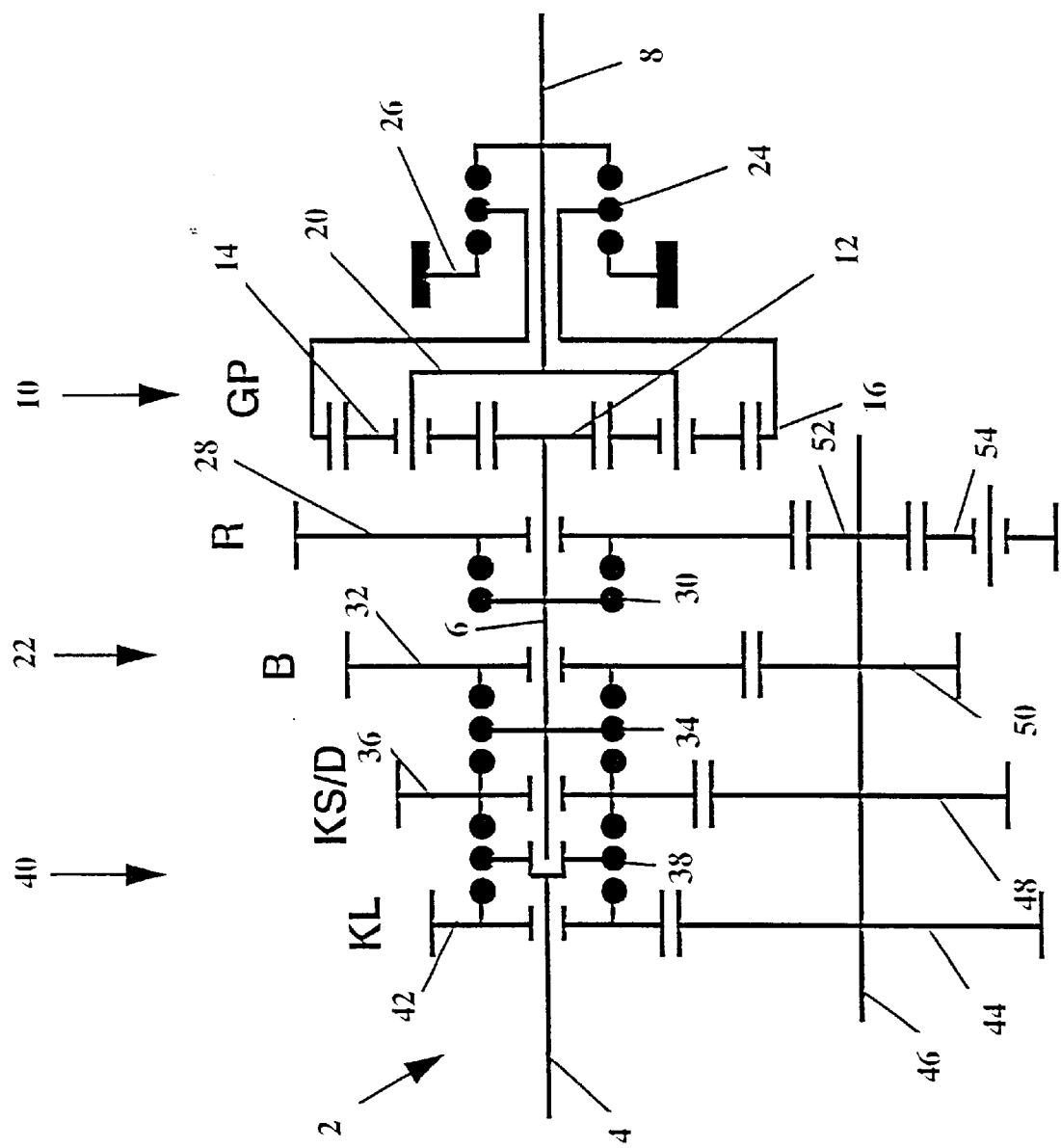
FIG. 1 is a transmission diagram for a direct-speed transmission with 8 gears.

In all figures, the same part are provided with the same reference numerals.

FIG. 1 shows a transmission 2 in an 8-gear variant. An input shaft 4 is placed coaxially to a main shaft 6 of a main gear part 22. At the end of the main shaft 6 is provided a sun gear 12 of a group transmission part 10 designed as planetary transmission. The sun gear 12 meshes with planetary gears 14 which are supported on a planet carrier 20. The planetary gears 14 further mesh with a ring gear 16 which, via a shift device 24, can be connected either with the housing 26 or with the output shaft 8 of the transmission 2. The output shaft 8 is connected with the planet carrier 20. Upon the main shaft 6 are further situated a reverse gear wheel 28 which can be non-rotatably connected, via a shifting device 30, with the main shaft 6. Upon the main shaft 6 is also situated a gear wheel 32 which can be non-rotatably connected, via a shift device 34, with the main shaft 6. One other gear wheel 36 upon the shaft 6 can be likewise connected, via the shift device 34, with the shaft 6. The gear wheel 36 can also be connected, via the shift device 38, in the split gear part 40 with the input shaft 4. The input shaft 4 carries a gear wheel 42 which is freely rotatable in relation to the input shaft and is engaged with a gear wheel 44 of the countershaft 46 of the main gear 42. On its axial end, facing the main gear 22, the input shaft 4 carries the shift device 38, which makes possible for a torque transmission non-rotatably to connect the input shaft 4 either with the loosely turning gear wheel 42 or with the gear wheel 36 freely rotatably situated upon the main shaft 6 of the main gear 22. The first gear wheel pair with the loose gear wheel 42 upon the input shaft 4 and the gear wheel 44 upon the countershaft 46 meshing therewith also are often designated as first constant or constant I while the second gear wheel pair consisting of the loose gearwheel 36 situated upon the main shaft 6 and the gear wheel 48 upon the countershaft meshing therewith are designated as second constant or constant II. With the aid of the shift device 38, either the constant I or the constant II is engaged in the torque transmission. One other gear wheel 50 upon the countershaft 16 meshes with the gear wheel 32 and a gear wheel 52 upon the countershaft 26 meshes with a reverse gear 54 which, in turn, meshes with the gear wheel 28.

Figure 2:
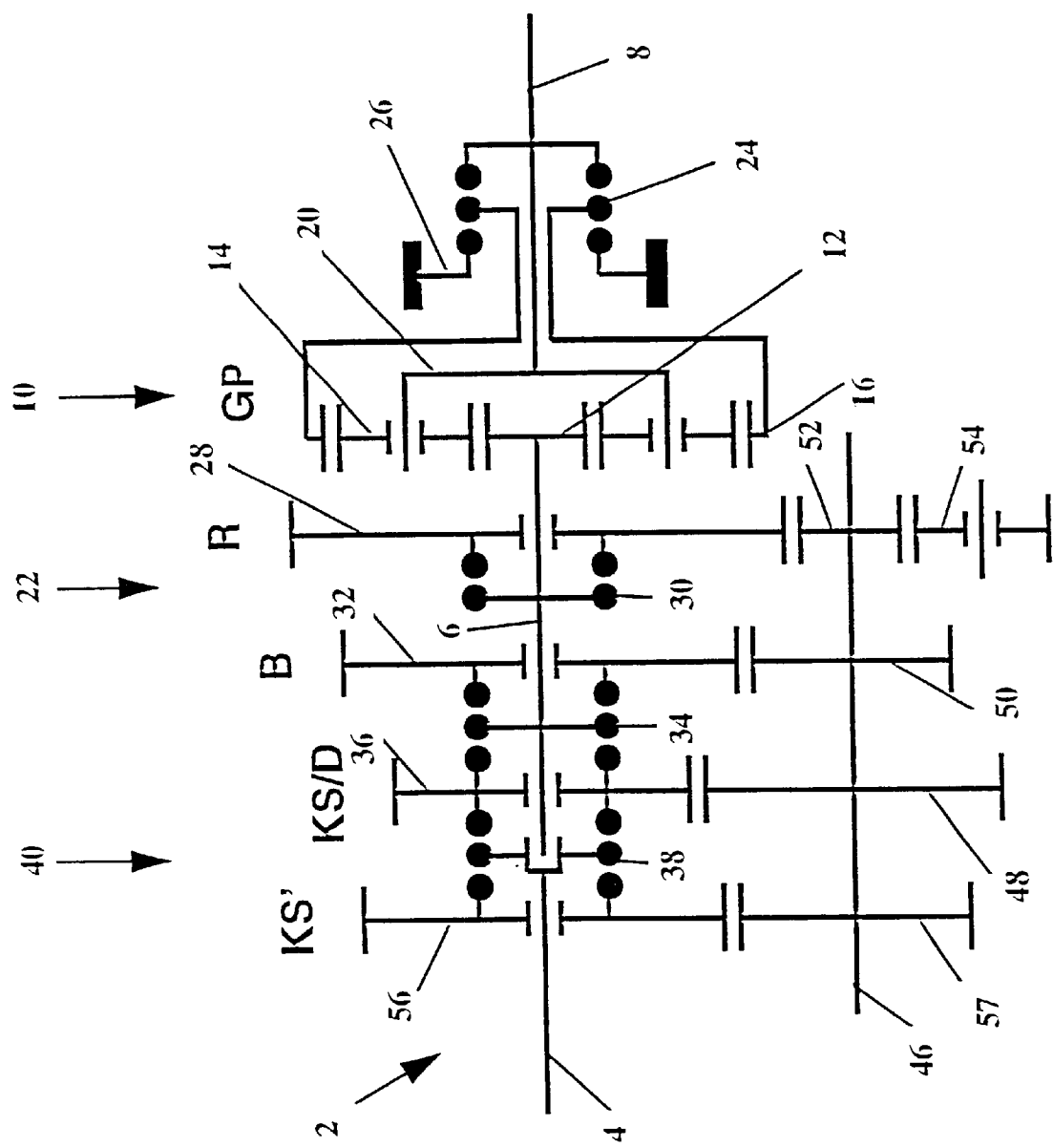
FIG. 2 is a transmission diagram for a high-speed transmission with 8 gears.

FIG. 2 shows a high-speed variant of the 8-gear transmission of FIG. 1. The gear wheel pair of the constant I consisting of the gear wheels 42 and 44 of FIG. 1 is exchanged for a gear wheel pair quicker by two ratio steps and consisting of the gear wheels 56 and 57. All other parts remain the same as in FIG. 1.

FIG. 3 shows a shift pattern 58 for 8-gear transmissions which applies to both variants of FIG. 1 and FIG. 2. In the selector lever position, designated with R1/2, the shift device 30 of FIG. 1 is operated so that the gear wheel 28 for the reverse motion is non-rotatably connected with the main shaft 6. The change over between first and second reverse motion results from the shift device 38 in the split gear part 40, the selector lever position being retained in the position R1/2. When changing to the shift gate 68, the shift device 30 is first disengaged from its torque transmission and then the selector lever position for either the gears ½ or ¾ is introduced in the shift gate 68 by actuating the shift device 34. In the selector lever positions, the same as in all the correspondingly designated positions that follow, the shift device 38 also effects a change between gear 1 and 2 or 3 and 4. A change in the shift gate 70 produces a change over of the shift device 24 from a slow ratio to a quick ratio. To this end in the selector gate 72 is overcome a position 75 which produces a predominantly pneumatically actuated change over of the shift device 24. Then, during the shift in the shift gate 70, the shift device 34 is again actuated to the right, according to FIG. 1 or 2, to reach the selector lever position 5/6 and to the left to reach the position 7/8.

The transmission variants of FIGS. 1 and 2 show the basic variants. The teeth of the parts used therein are provided in all variants that follow and remain equal for all variants.

Figure 4:
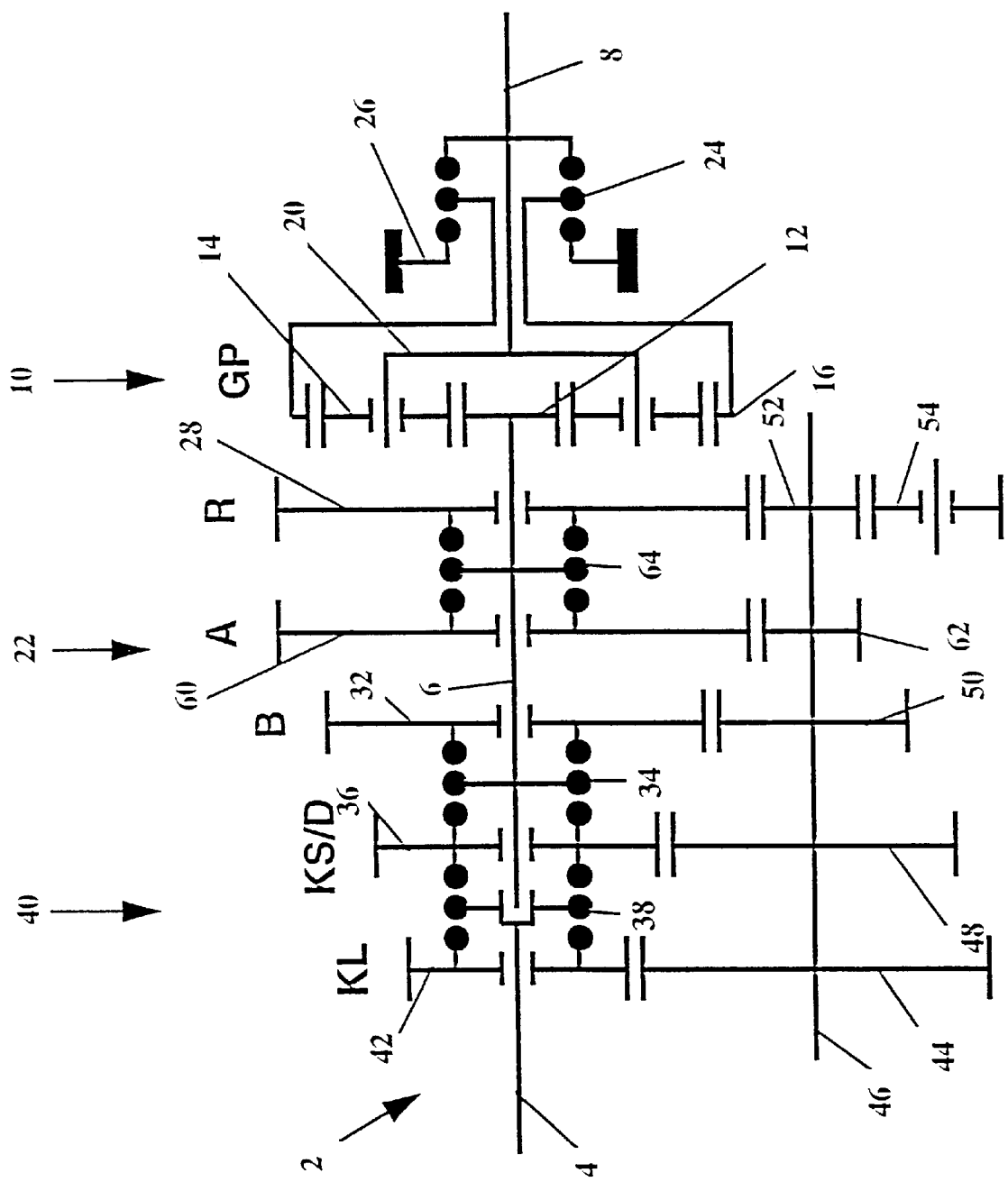
FIG. 4 is a transmission diagram for a direct-speed transmission with 10 gears.

FIG. 4 thus shows a 10-gear transmission which, unlike the transmission in FIG. 1, has an additional gear wheel pair. The additional gear wheel pair consists of the gear wheel 60 loosely rotatable on the main shaft 6 and the gear wheel 62 fixedly connected with the countershaft. A modified'shift device 64 is provided for non-rotatable connection of the gear wheels 60 and 28 with the main shaft 6.

Figure 5:
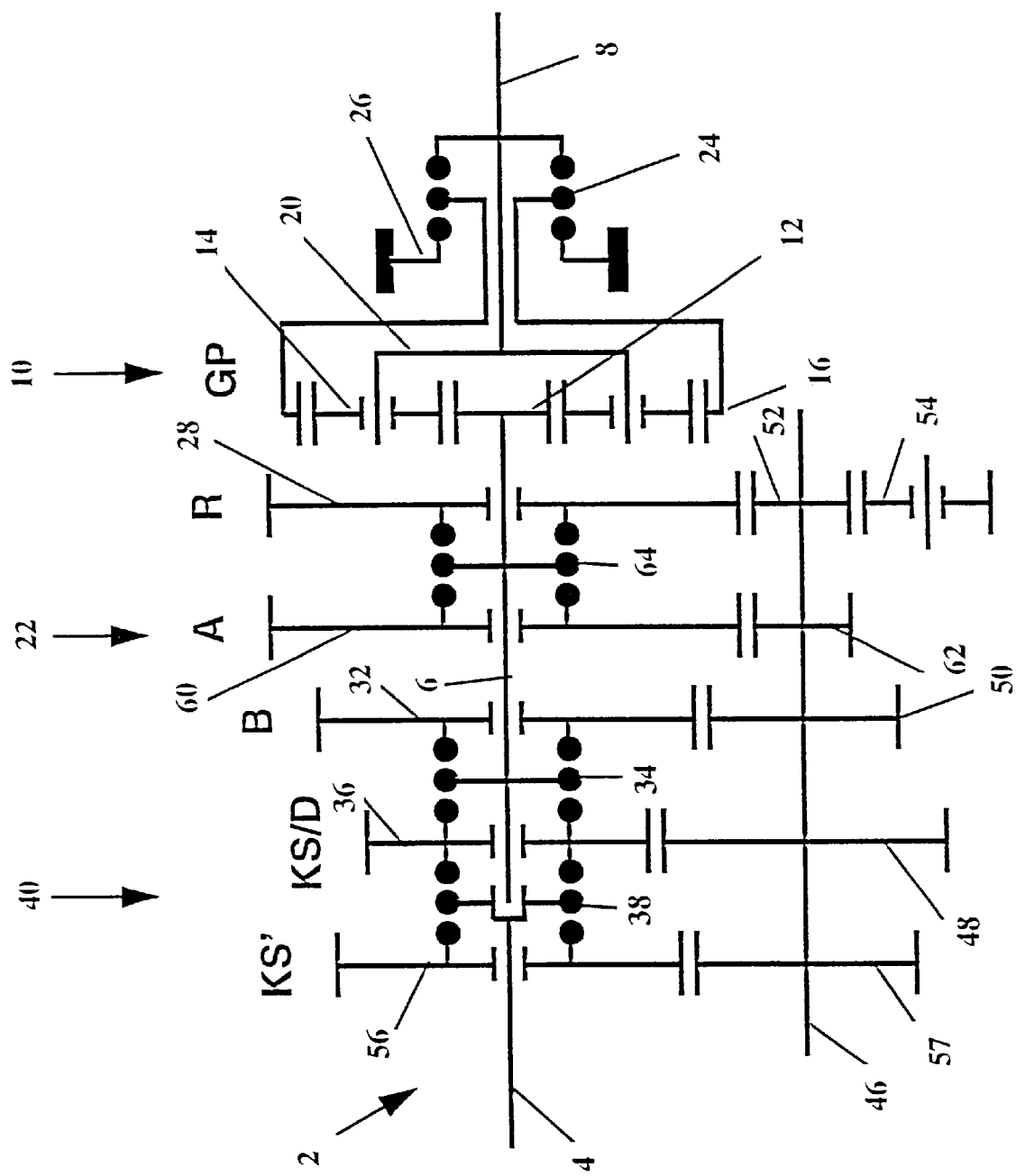
FIG. 5 is a transmission diagram for a high-speed transmission with 10 gears.

FIG. 5 thus shows a 10-gear transmission in a high-speed variant which, unlike the transmission in FIG. 2, has an additional gear wheel pair. The additional gear wheel pair consists of the gear wheel 60 loosely rotatable on the main shaft 6 and the gear wheel 62 firmly connected with the countershaft 46. To non-rotatably connect the gear wheels 60 and 62 with the main shaft 6, a modified shift device 64 is again provided. Unlike the variant, such as shown in FIG. 4, the variant according to FIG. 5 has a changed constant I which here, the same as in FIG. 2, consists of a gear wheel pair which comprises the gear wheels 56 and 57. All other teeth correspond to the teeth of the basic variant both in the direct-speed variant according to FIG. 1 and in the high-speed variant according to FIG. 2.

FIG. 6 shows a shift pattern 66 for 10-gear transmissions which applies to both variants of FIG. 4 and FIG. 5. In the selector lever position, designated with R1/2, the shift device 64 of FIG. 4 is operated so that the gear wheel 28 for the reverse gear is non-rotatably connected with the main shaft 6. The change over between the first and second reverse gears results by the shift device 38 in the split transmission part 40, wherein the selector lever position is maintained in the position R1/2. According to this shift pattern, the forward gears 1 and 2 are in the same shift gate 74 as the reverse gears. When changing in the shift gate 76, the shift device 64 is first disengaged from its torque transmission and then the selector lever position for either the gears 5/6 or 3/4 is introduced in the shift gate 76 by actuating the shift device 34. A change in the shift gate 78 produces a change over of the shift device 24 from a slow ratio to a quick ratio. To this end in the selector gate 80, a position 82 is overcome which produces a predominantly pneumatically actuated. change over of the shift device 24.

Figure 7:
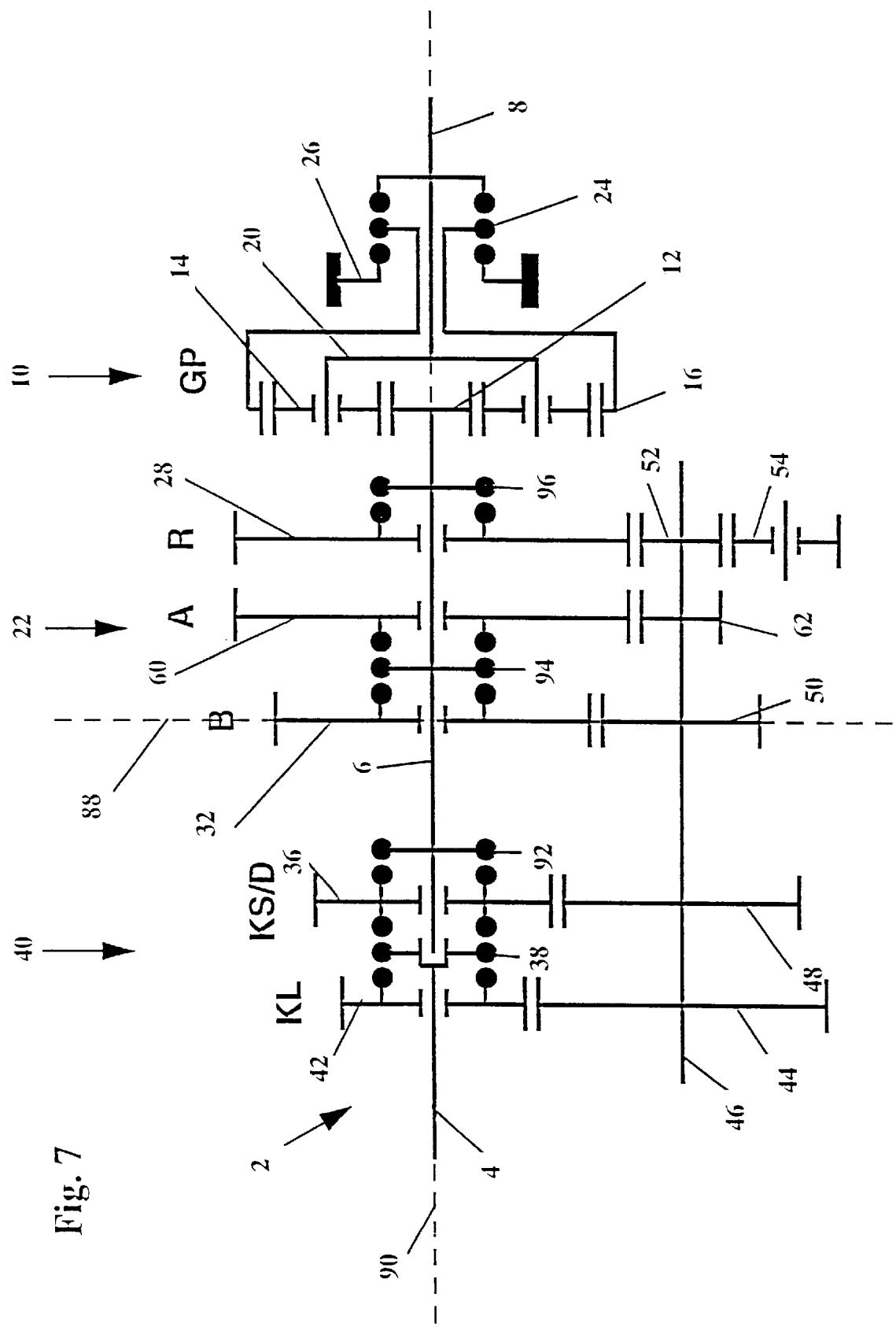
FIG. 7 is a transmission diagram for a direct-speed transmission with 10 gears.

FIG. 7 and FIG. 8 show two other variants of a 10-gear transmission with a modified arrangement of the gear wheel pairs so that in the outer shift gate 86 according to FIG. 9 there must be provided a reversal of shifting direction. FIG. 7 uses the same parts as the variant in FIG. 4. The gear wheel 32 is disposed on the main shaft 6 rotated by 180° around an imaginary axis 88 which stands perpendicularly on the axis 90 formed by the longitudinal axis of the main shaft 6. The gear wheels 28 and 60 are likewise turned by 180°. The shift device 92, 94 and 96 are correspondingly changed. The actuation to the right of the respective shift devices in each figure corresponds to the upward movement from the respective selector gate to a selector lever position in the appertaining shift pattern. FIG. 9 shows such a shift pattern 98 for 10-gear transmissions which applies to both variants according to FIG. 7 and FIG. 8. In the selector lever position, designated with R1/2, the shift device 96 of FIG. 7 is operated so that the gear wheel 28 for the reverse gear be non-rotatably connected with the main shaft 6. To that end, the shift device 96 is moved to the left in FIG. 7. The shifting between the first and second reverse gears results by the shift device 38 in the split transmission part 40, the selector lever position being retained in the position R1/2. According to this shift pattern, the forward gears 1 and 2 are in the same shift gate 100 as the gears 3 and 4 corresponding to the shift pattern 58 in FIG. 3. When changing in the shift gate 100, the shift device 96 is first switched off from its torque transmission and then, by actuating the shift device 94, the selector lever position either for the gears ½ or for the gears ¾ is introduced in the shift gate 100. A change in the shift gate 102 produces a change over of the shift device 24 from a slow ratio to a quick ratio. For that purpose, there is overcome in the selector gate 104 a position 82 which causes a change over of the predominantly pneumatically actuated shift device 24. In the shift gate 102 are obtained the shift positions 5/6 and 7/8 for the corresponding gears 5, 6 and 7 and 8. A further movement to the right in the shift pattern 98 leads to a shift gate 106 where lies the selector lever position for the gears 9 and 10. If the selector lever in the shift gate 100 is guided from top to bottom, this corresponds to a shift movement of the shift device 94 from right to left in FIG. 7 and FIG. 8. A movement of the selector lever from the position 3/4 in the shift gate 100 to the position 5/6 in the shift gate 102 corresponds to a movement of the shift device 94 from left to right in FIGS. 7 and 8. Due to the fact that after overcoming the position 82, a change over of the planetary transmission has occurred, the same transmission ratio as previously is not reached despite the engagement of the same gear wheel 60 in the torque transmission. Upon reaching the selector lever position 9/10 relative to the selector gate 104, on one hand, a position opposite to the position R1/2 is assumed but, on the other hand, the shift device 92 for connecting the gear wheel 36 with the main shaft must be moved to the left in FIGS. 7 and 8, a reversal of direction of movement of the selector lever in the shift gate 106 is required. But the same steps needed for this purpose are not object of this invention.

FIG. 8 shows the configuration corresponding to FIG. 7 for a high-speed variant of the 10-gear transmission according to FIG. 5.

Figure 10:
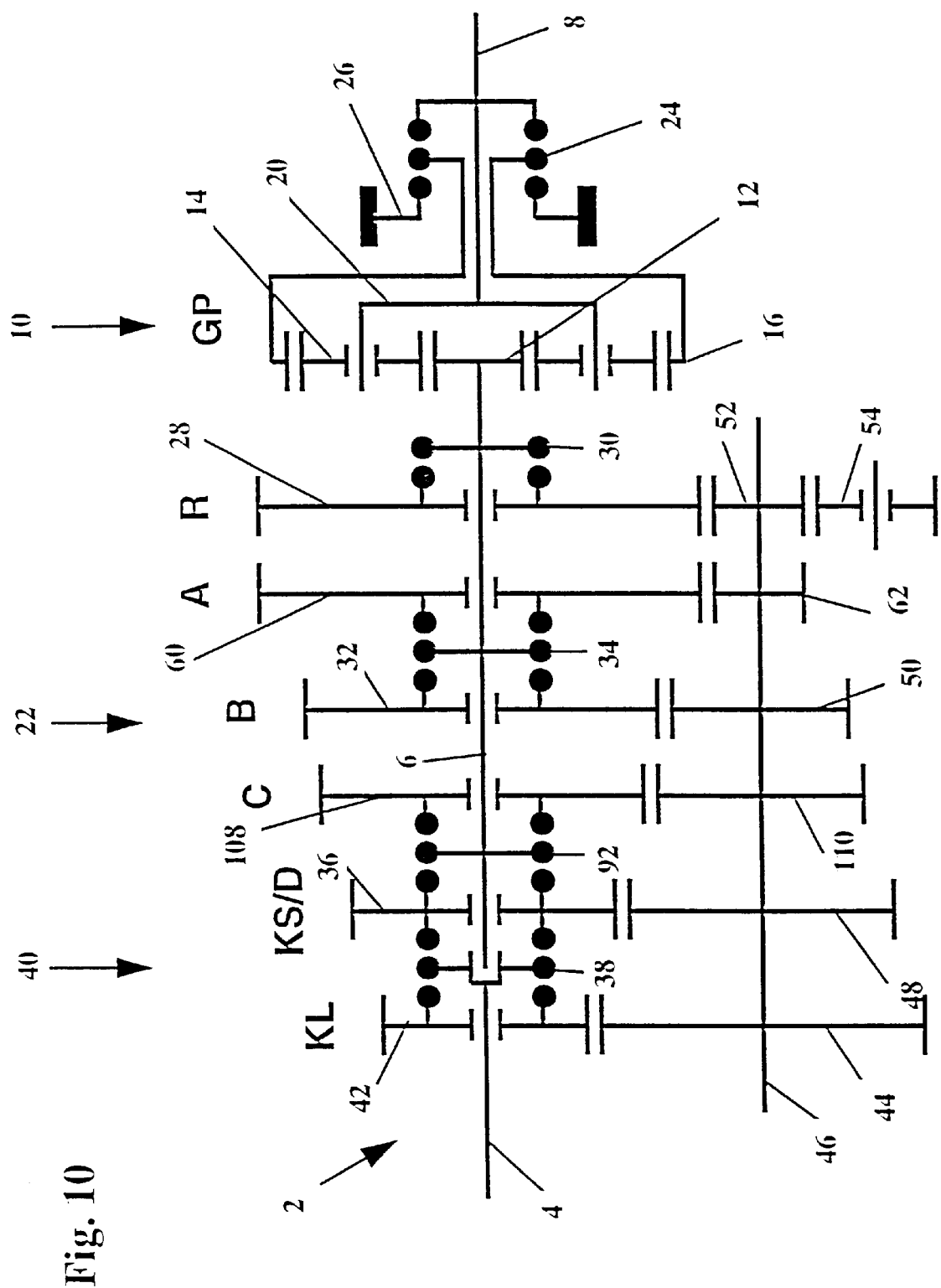
FIG. 10 is a transmission diagram for a direct-speed transmission with 12 gears.

FIG. 10 shows a variant of a 12-gear transmission where, unlike the variant according to FIG. 7, one other gear wheel pair is added. The additional gear wheel pair comprises the gear 108 loosely rotatable on the main shaft 6 and the gear wheel 110 firmly connected with the countershaft 46. A modified shift device 92 is provided for the non-rotatable connection of the gear wheels 108 and 36 with the main shaft 6.

Figure 11:
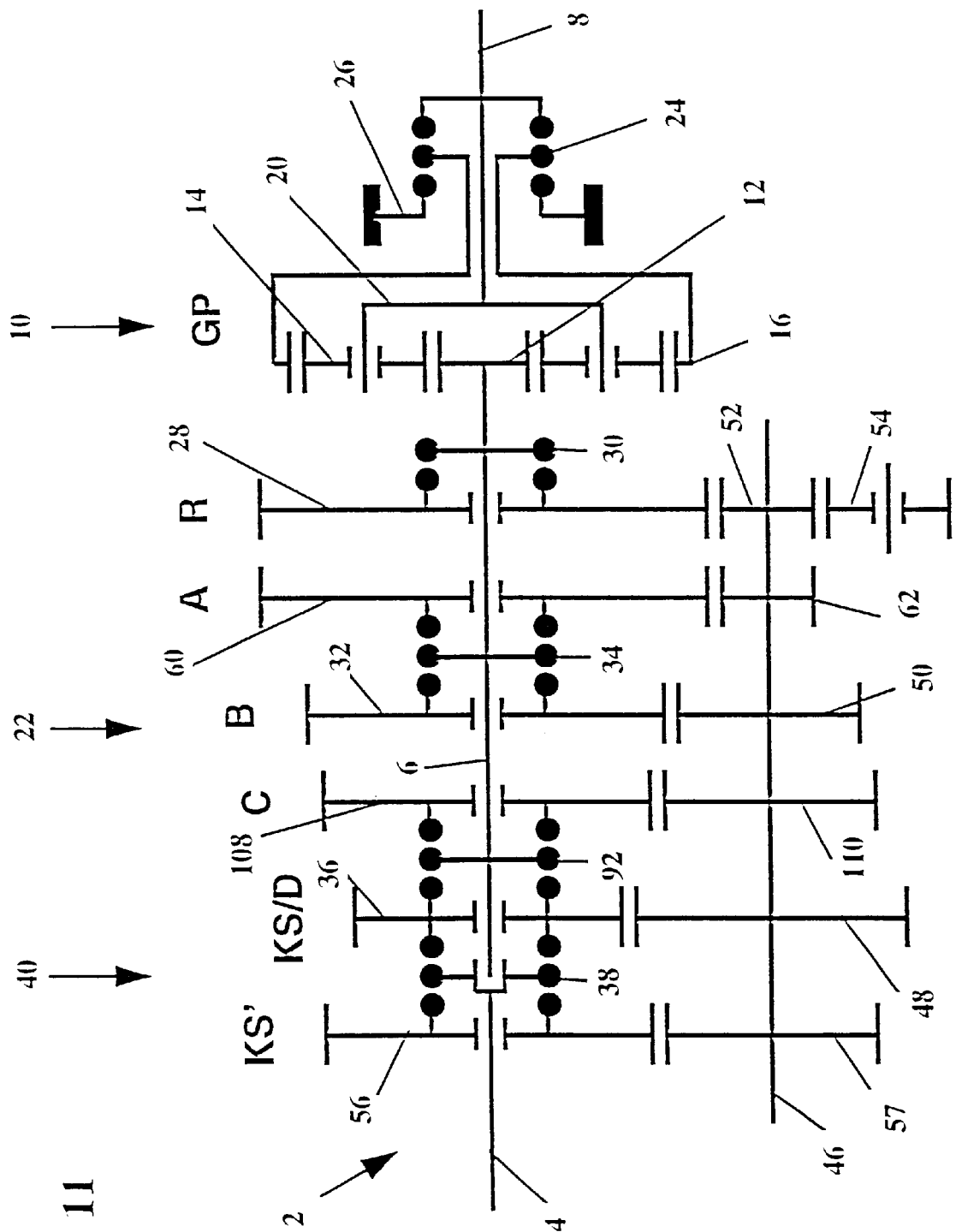
FIG. 11 is a transmission diagram for a high-speed transmission with 12 gears.

FIG. 11 shows a 12-gear transmission in a high-speed variant which unlike the transmission of FIG. 8 has an additional gear wheel pair. The additional wheel pair comprises the gear wheel 108 loosely rotatable on the main shaft 6 and the gear wheel 110 firmly connected with the countershaft 46. A modified shift device 92 is again provided for nonrotatable connection of the gear wheels 108 and 36 with the main shaft 6. Compared to the variant, such as shown in FIG. 10, the variant according to FIG. 11 has a changed constant I which like in FIG. 2 consists here of a gear wheel pair comprising the gear wheels 56 and 57. All other teeth correspond to the teeth of the basic variant both in the direct-speed variant of FIG. 1 and in the high-speed variant of FIG. 2

FIG. 12 shows a shift pattern 114 for a 12-gear transmission. Compared to the shift pattern of FIG. 9, an additional shift position 10/12 is provided in the shift gate 106. When the selector lever moves to this position, the shift device 92 of FIG. 10 or 11 moves to the left so that a connection is obtained between gear wheel 36 and main shaft 6. The shift pattern 114 applies to both variants according to FIG. 10 and FIG. 11.

Figure 13:
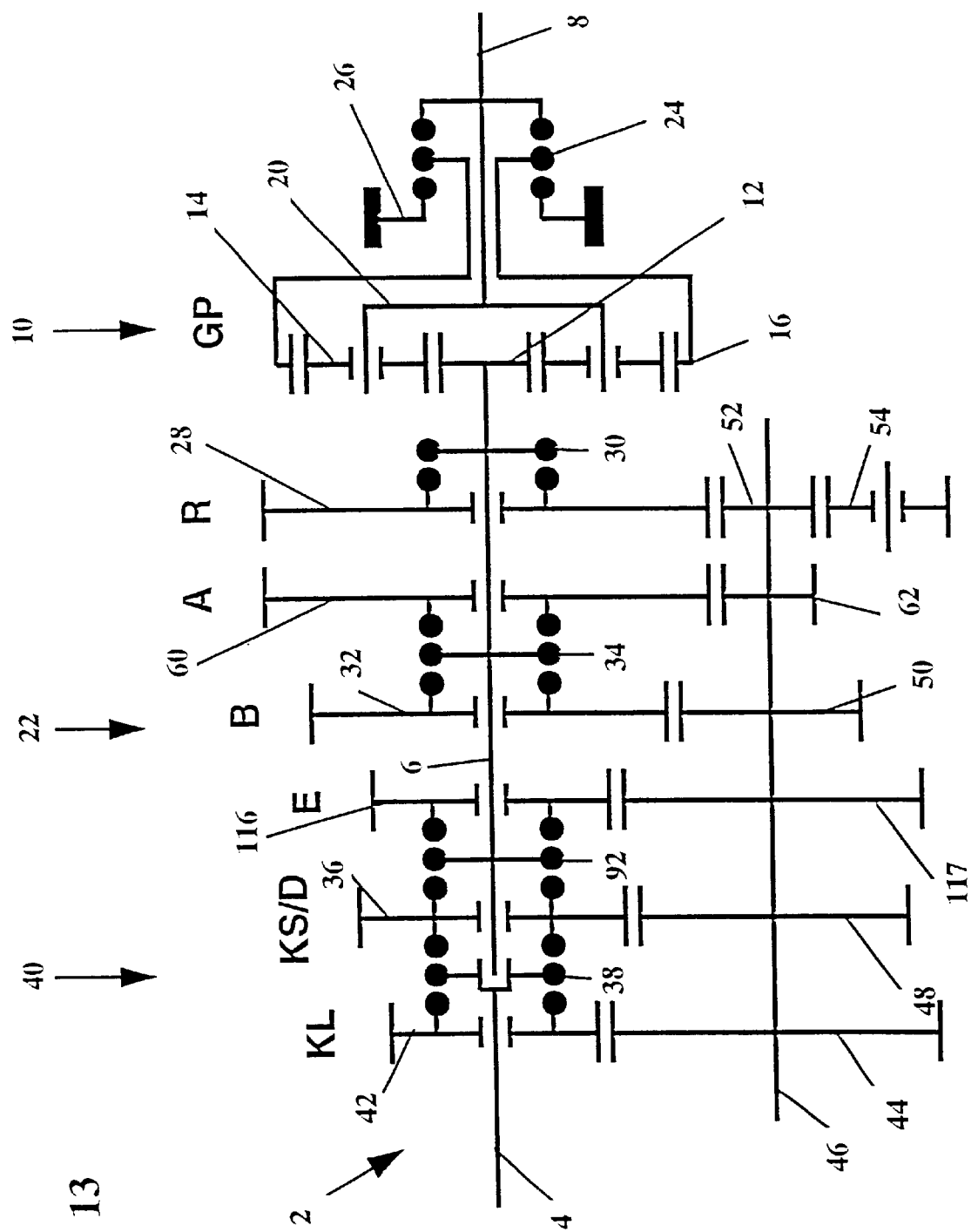
FIG. 13 is anothertransmission diagram for a high-speed transmission with 12 gears.

FIG. 13 shows one other high-speed variant for a 12-gear transmission where, unlike the direct-speed variant of FIG. 10, not the gear wheel pair of the constant I consisting of the gear wheels 42 and 44, but the two gear wheels 108 and 110 are replaced by the two gear wheels 116 and 117. The wheel pair 116-117 is quicker by a whole ratio range than the original wheel pair. It is thereby possible, while maintaining constant I and constant 11, to obtain from the direct-speed variant a high-speed variant having a total spread higher by a half ratio range.

Figure 14:
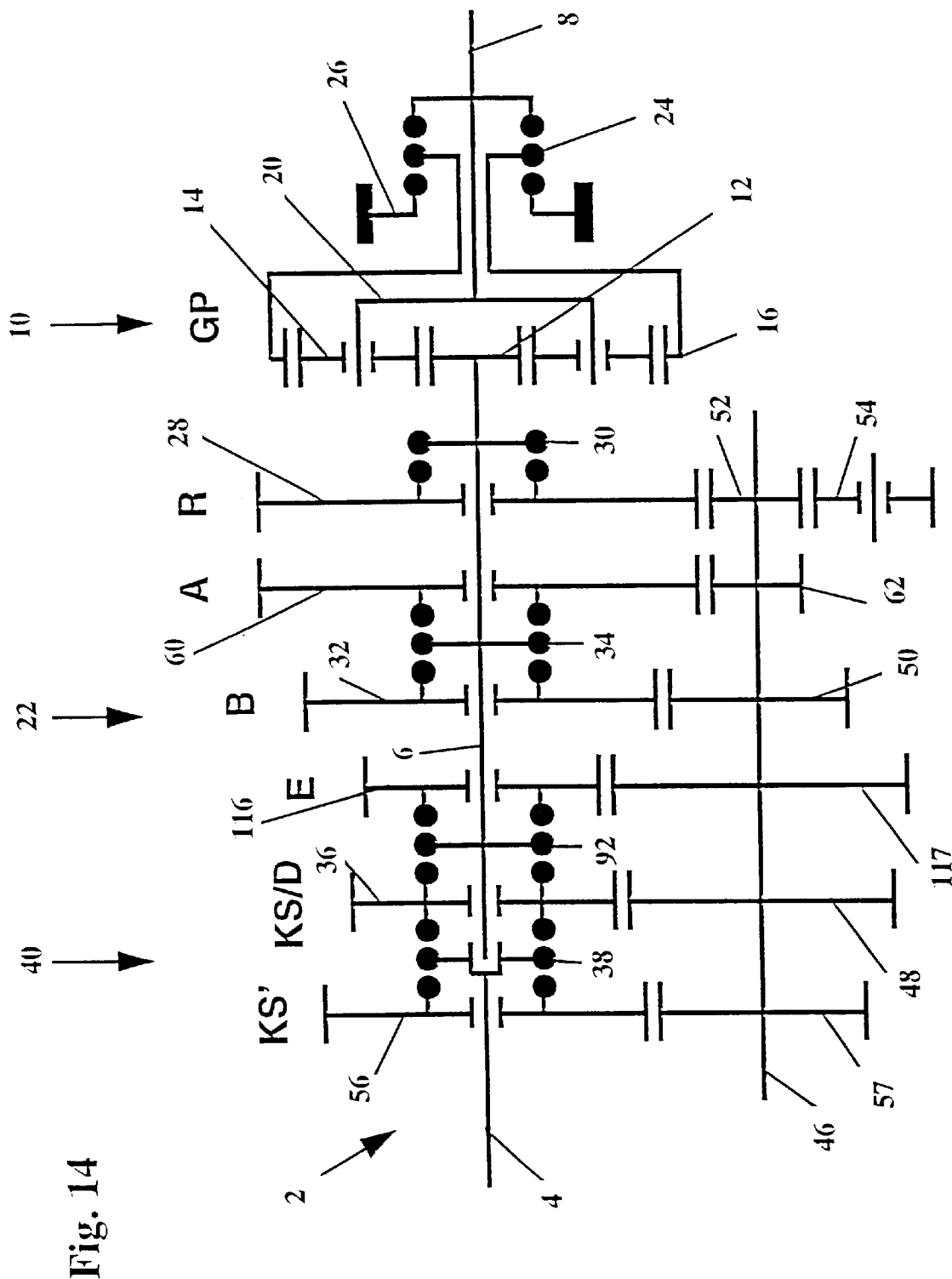
FIG. 14 is another transmission diagram for a high-speed transmission with 12 gears.

FIG. 14 shows another high-speed variant for a 12-gear transmission having a changed constant I in comparison with FIG. 13. Compared to the high-speed variant of FIG. 11, only the gear wheels 108 and 110 are here exchanged for the gear wheels 116 and 117 which have a total spread higher by half a ratio range.

In the shift pattern 114 of FIG. 12, when the highest shift position 10/12 is reached, the shift device 92 is moved to the left in FIG. 10 and FIG. 11. However, in the shift pattern 118 of FIG. 15, which applies to the high-speed variants of FIG. 13 and FIG. 14, the shift device 92 must be moved to the right in FIG. 13 and FIG. 14, since the highest ratios are obtained when engaging the gear wheel 116. If the arrangement of the shift positions from shift pattern 114 should also be kept in shift pattern 118, similarly to FIG. 9 the shift direction must be reversed in the shift gate 106 in shift pattern 118. But the steps needed to this end are not object of this invention.

FIG. 16 and FIG. 17 show two shift patterns 120 and 122 for a transmission having a partial automation of the gears above the sixth gear. The shift patterns 120 and 122 can be used for 10-gear variants. In the selector gate 80, a position 82 is overcome during the selection and a gear shift position AUTO is obtained, which in the shift pattern 122 is at the right end of the selector gate 80. In the shift pattern 120, the shift position is on the upper end of the shift gate 78. In the shift position AUTO, all gear shifts are no longer produced by changing the shift positions by means of selector levers, the higher gears being automatically engaged within admissible limits by a computer unit.

FIG. 18 and FIG. 19 show shift patterns 124 and 126 corresponding to the shift patterns 98, 114 and 118 of FIGS. 9, 12 and 15. They apply to 10-gear and 12-gear variants with adequate arrangement of the shift positions AUTO in the shift gate 106 or at the end of the selector gate 104.

FIG. 20 shows a shift pattern 128 corresponding to the shift pattern 66 of FIG. 6. The shift pattern 128 applies to 10-gear variants, the gear shift position AUTO being situated in the shift gate 78.

FIG. 21 shows by way of example a construction of the ratio line of a 12-gear transmission with a shift pattern 114 according to FIG. 12 and a transmission diagram according to FIG. 10. It can be seen that for the first four gears of the group transmission part 10, each is engaged in the slow ratio step. Starting from the fifth gear, the group transmission part 10 is 1shifted to the quick ratio step and remains for the gears that follow in the shifted position which no more is changed. In each of the fifth to eighth gears the same gear wheels 32, 36, 42 and 60 are shifted as in the gears one to four only with the high-speed ratio step in the group transmission part 10. In gears nine and eleven, either the gearwheel 42 of the constant I or the gear wheel 36 of the constant II are engaged, the same as the gear wheel 108 in the torque transmission. In the gears ten and twelve either the gear wheel 42 of the constant I and gear wheel 36 are engaged in the torque transmission or a direct connection of the input shaft 4 with the main shaft 6 is obtained.

FIG. 22 shows by way of example a construction of the ratio line of a 10-gear transmission with a shift pattern 98 according to FIG. 9 and a transmission diagram according to FIG. 7. It can be seen that each of the first four gears of the group transmission part 10 is shifted to the slow ratio step. Starting from the fifth gear, the group transmission part 10 is shifted to the quick ratio step and for the gears that follow remains in this switched position which no more is changed. In each of the gears five to eight, the same gear wheel 32, 36, 42 and 60 are shifted as in gears one to four only with the quick ratio step in the group transmission part 10. Compared to FIG. 10, the gearwheel 108 is missing in FIG. 7, Therefore, the ratio of the ninth gear corresponds to the ratio of the tenth gear of FIG. 21 and the ratio of the tenth gear to the ratio of the twelfth gear of FIG. 21. It results herefrom that in the 12-gear variant of FIG. 21, the ratio of the ninth gear is between the ratios of the eighth and ninth gears of the 10-gear variant of FIG. 22 and the ratio of the eleventh gear of the 12-gear variant is between the ratios of the ninth and tenth gears of the 10-gear variant. In the gears nine and ten, either the gear heel 42 of the constant I and gear wheel 3 are engaged in the torque transmission or a direct connection of the input shaft 4 with the main shaft 6 is obtained with the shift devices 92 and 38.

FIG. 23 shows by way of example one other construction of the ratio line of a 10-gear transmission with a shift pattern 66 according to FIG. 6 and a transmission diagram according to FIG. 4. It can be seen that for each of the first six gears of the group transmission part 10, the slow ratio step is shifted to. In the gears five and six either the gearwheel 42 of the constant I and the gear wheel 36 are engaged in the torque transmission or a direct connection of the input shaft 4 with the main shaft 6 is obtained with the shift device 34 and 38. Starting from the seventh gear, the group transmission part 19 is shifted to the quick ratio step and for the gears that follow remains in this switched position which is changed no more. In the gears seven to ten, the same gear wheels 32, 36 and 42 are shifted as in the gears three to six only with the quick ratio step in the group transmission part 10. Compared to FIG. 10, the gearwheel 108 is missing in FIG. 4. Therefore, the ratio of the ninth gear corresponds to the ratio of the tenth gear of FIG. 21 and the ratio of the tenth gear to the ratio of the twelfth gear of FIG. 21. It results herefrom that in the 12-gear variant of FIG. 21, the ratio of the ninth gear is between the ratios of the eighth and ninth gears of the 10-gear variant of FIG. 23 and the ratio of the eleventh gear of the 12-gear variant is between the ratios of the ninth and tenth gears of the 10-gear variant.

FIG. 24 shows by way of example a construction of the ratio line of an 8-gear transmission with a shift pattern 58 according to FIG. 3 and a transmission diagram according to FIG. 1. It can be seen that for the first four gears of the group transmission part 10, each is shifted to the slow ratio step. In the gears three and four either the gear wheel 42 of the constant I and the gear wheel 36 are engaged in the torque transmission or a direct connection of the input shaft 4 with the main shaft 6 is obtained with the shift devices 34 and 38. Starting from the fifth gear, the group transmission part 10 is shifted to the quick ratio step and for the gears that follow remains in this shifted position which is no more changed. In each of the gears five to eight, the same gear wheels 32, 36, and 42 are shifted as in the gears one to four only with the quick ratio step in the group transmission part 10.

Reference Numerals 2 transmission
4 input shaft
6 main shaft
8 output shaft
10 group transmission part
12 sun gear
14 planetary gears
16 ring gear
20 planet carrier
22 main gear part
24 shift device
26 housing
28 reverse gear wheel
30 shift device
32 gear wheel
34 shift device
36 gear wheel
38 shift device
40 split gear part
42 gear wheel
44 gear wheel
46 countershaft
48 gear wheel
50 gear wheel
52 gear wheel
54 reverse gear wheel
56 gear wheel
57 gear wheel
58 shift pattern
60 gear wheel
62 gear wheel
64 shift device
66 shift pattern
68 shift gate
70 shift gate
72 selector gate
74 shift gate
75 position
76 shift gate
78 shift gate
80 selector gate
82 position
86 shift gate
88 axis
90 axis
92 shift device
94 shift device
95 shift device
98 shift pattern
100 shift gate
102 shift gate
104 selector gate
106 shift gate
108 gear wheel
110 gear wheel
114 shift pattern
116 gear wheel
117 gear wheel
118 shift pattern
120 shift pattern
122 shift pattern
124 shift pattern
126 shift pattern
128 shift pattern

What is claimed is:

1. A transmission having a basic configuration providing a basic number of gear ratio steps and corresponding gear ratios and implementable in a plurality of variants having selected numbers of transmission gear ratio steps and associated gear ratios, the variants sharing a common transmission housing and being implemented solely by the addition of pairs of gears and associated shift devices within the transmission housing or by the alteration of existing gear ratios, the basic transmission configuration comprising:

a split gear part having an input shaft;

a main gear part having a main shaft concentric with the input shaft;

a shared countershaft parallel to both the input shaft and the main shaft; and a group transmission part having an output shaft from a planetary transmission connected from the main shaft and a planetary shift device to select a ratio thereof;

constant selection gears including a first constant gear pair mounted on the input shaft and the countershaft and a second constant gear pair mounted on the main shaft and the countershaft and an associated shifting device for engaging a desired one of the first and the second constant gear ratios;

a reversing gear and an associated reversal shifting device connected between the main shaft and the countershaft for reversing rotation of the transmission output; and a pair of transmission ratio gears mounted on the main shaft and the countershaft and an associated ratio shifting device for engaging the ratio gears to select a corresponding gear ratio.

2. The transmission of claim 1, wherein the gear ratios available in a configuration of the transmission are determined by the ratios of the pairs of ratio gears and the group transmission and a selected gear ratio is determined by the selected engagements of the shifting devices.

3. The transmission of claim 1, wherein the planetary transmission of the group transmission part includes a sun gear mounted on an output end of the main shaft and engaging with planetary gears supported on a planet carrier connected to the output shaft, the planetary gears meshing with a ring gear that is engageable with a selectable one of a transmission housing and the output shaft through a planetary shift device.

4. The transmission of claim 1, wherein a selected one of a high speed variant and a standard direct variant of a configuration of the transmission is determined by the ratios of the first constant gears and the ratios of the second constant gears.

5. The transmission of claim 1, wherein a selected one of a high speed variant and a standard direct variant of a configuration of the transmission is determined by the ratios of the constant selection gears.

6. The transmission of claim 1, wherein the number of selectable gear ratios is increased over the number of selectable gear ratios of the basic configuration by each addition of a pair of transmission ratio gears to the main gear part.

7. The transmission of claim 1, wherein the number of selectable gear ratios is increased by two gears for each pair of transmission ratio gears added to the main gearypart.

8. The transmission of claim 1, including a plurality of pairs of transmission ratio gears and wherein selected pairs of pairs of transmission ratio gears share a common shifting device having an engagement element associated with each pair of the pair of pairs of transmission ratio gears and an engagement element associated with the main shaft to selectably engage one of the pair of pairs of transmission ratio gears with the main shaft to select the corresponding transmission gear.

9. The transmission of claim 1, wherein the constant selection gears comprise:

a pair of first constant gears including a first, first constant gear wheel mounted on the input shaft and freely rotatable therein and meshing wath a second, first constant gear wheel non-rotatably mounted on the countershaft; and a constant shifting device having a first constant engaging element connected to the first, first constant gear wheel, a constant engaging element connected to the input shaft, and a second constant engaging element connected to a first, second constant gear wheel of a pair of second constant gears;

wherein thefirst constant and constant engaging elements of the constant shifting device operate to connect the first, first constant gear wheel of the pair of first constant meshing gear wheels to the input shaft to provide a first constant gear ratio, and in the main gear part the pair of second constant gears, including the first, second constant gear wheel mounted on the main shaft and freely rotatable thereon and a second, second constant gear wheel non-rotatably mounted on the countershaft, and the constant and second constant engaging elements of the constant shifting device operate to connect the input shaft to the first, second constant gear wheel of the pair of second constant gears to provide a second constant gear ratio.

10. The transmission of claim 1, wherein the reversing gears and associated reversal shifting device connected between the main shaft and countershalt for reversing rotation of the transmission output comprise:

a first reversing gear wheel rotatably mounted on the main shaft 6 and meshing with a second reversing gearwheel, the second reversing gearwheel meshing with a third reversing gear wheel non-rotatably mounted on the countershaft, and a reversing shifting device that operating to selectably connect the first reversing gear wheel to the main shaft for reversal.

11. The transmission of claim 1, wherein a pair of transmission ratio gears comprises:

a first gear ratio gear wheel mounted on the main shaft and freely rotatable therein and meshing with a second gear ratio gear wheel non-rotatably mounted on the countershaft, and a gear ratio shifting device for connecting the first gear ratio gear wheel with the main shaft.

* * * * *